United States Patent Office 3,209,872
Patented Oct. 5, 1965

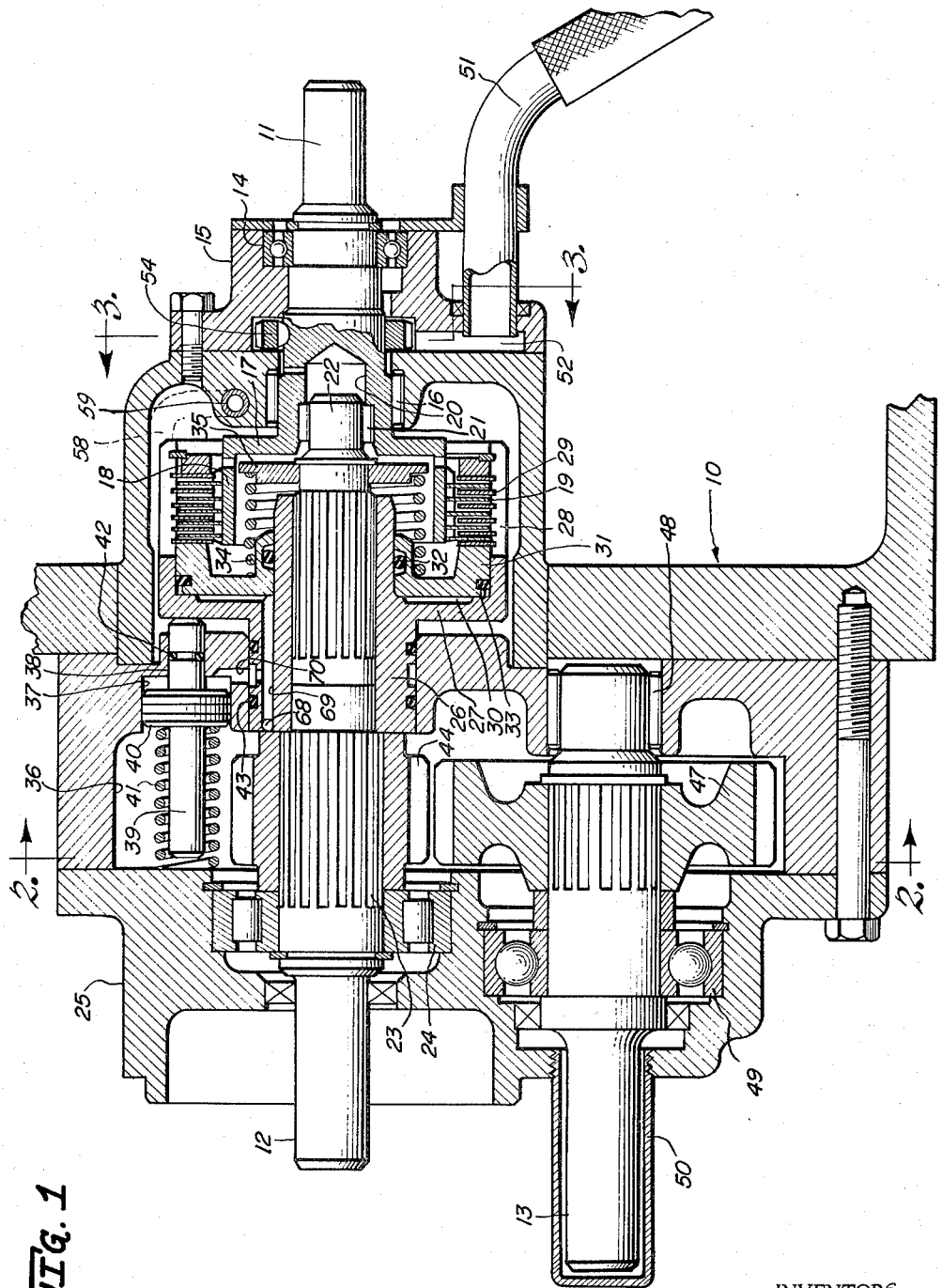

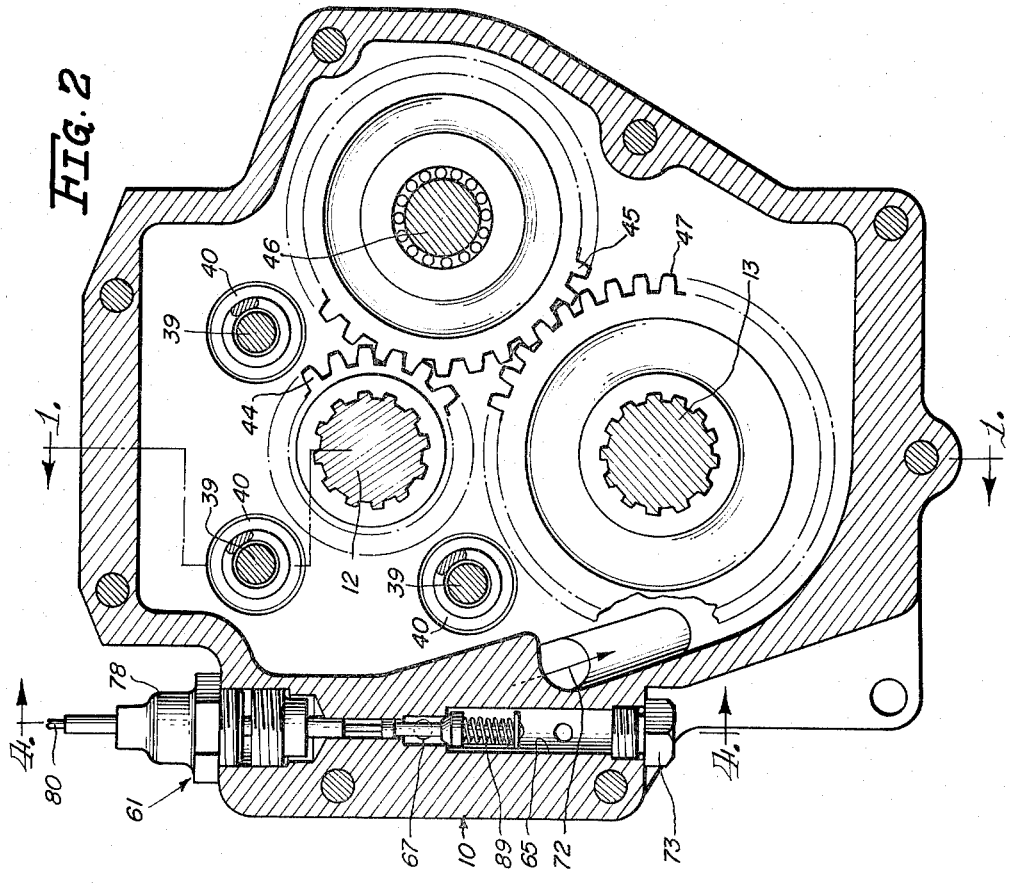
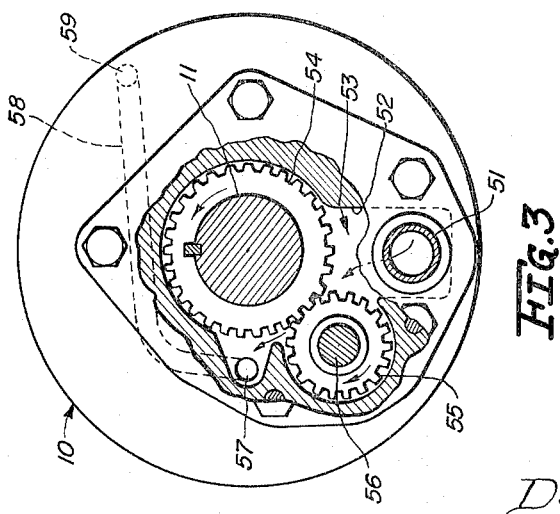

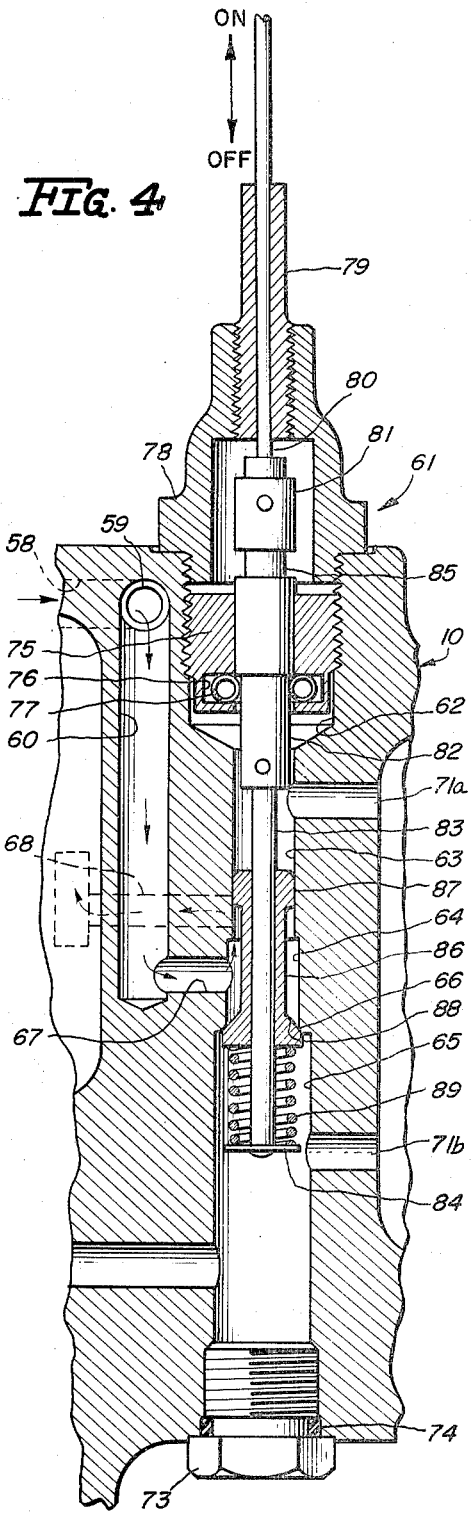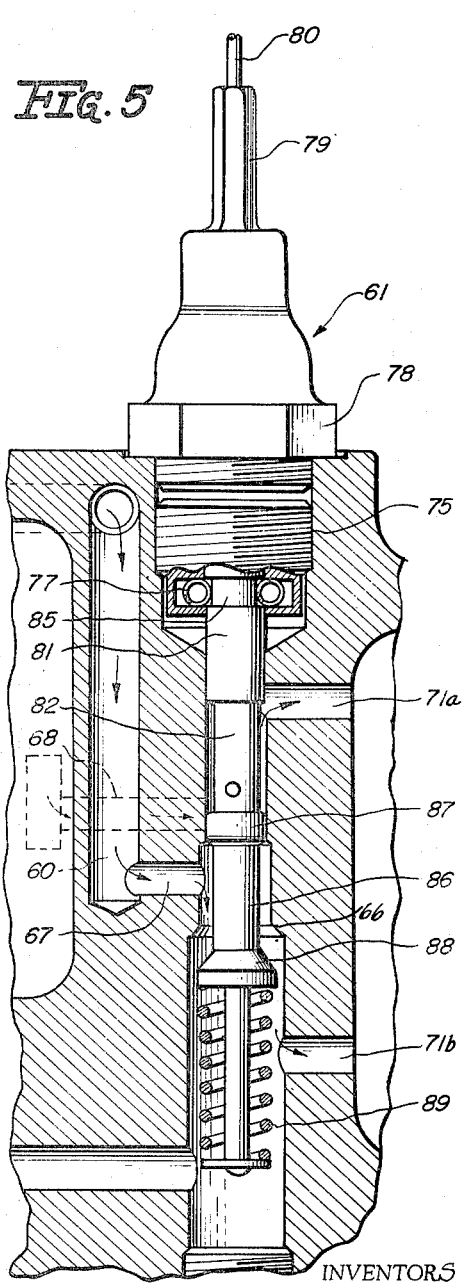

3,209,872
INDEPENDENT POWER TAKE-OFF WITH
CLUTCH AND ANTI-CREEP BRAKE
Donald W. Moyer, Chicago, and George T. Fiala, Downers Grove, Ill., assignors to International Harvester Company, Chicago, Ill., a corporation of New Jersey
Filed Apr. 19, 1962, Ser. No. 188,752
6 Claims. (Cl. 192—13)

This invention relates generally to clutch controlled driving mechanisms. Specifically it is concerned with an independent power take-off incorporating hydraulically operated clutch and anti-creep brake mechanisms for use with vehicles such as farm or industrial tractors.

Heretofore, most tractors were equipped with power take-offs for driving associated implements. The power take-off was generally connected through gearing to the tractor transmission so that engagement of the main tractor clutch would provide driving power for the associated implement. The modern farm or industrial tractor is usually provided with a power take-off driven by the main vehicle power plant and operable independently of engagement or disengagement of the main tractor clutch. The independent power take-off may be arranged to have the drive therefor bypass the driven element of the main tractor clutch so that drive is available when the power plant is in operation regardless of engagement or disengagement of the main tractor clutch. In such applications the independent power take-off would operate continuously unless some additional means were provided to discontinue operation thereof when desired. A separate power take-off clutching mechanism is usually provided for this purpose; however, when the power take-off clutch is disengaged there may be a tendency for the driven shaft thereof to continue freewheeling rotation. To avoid such rotation, or creep, there should be provided braking means which becomes effective upon disengagement of this clutch. There should also be provided actuating means for providing smooth, effective and efficient engagement and disengagement of the power take-off clutch and anti-creep brake mechanisms. It is to an improved device of this nature that the present invention is directed.

An object of this invention is to provide improved clutch and anti-creep brake means for engaging a driven rotatable member with a driving rotating member and for braking the rotatable member upon release of its engagement with the rotating member.

Another object of this invention is to provide hydraulic means for use with a combination clutch and anti-creep brake assembly which provides for smooth, effective, and efficient selective engagement and disengagement thereof.

Another object of this invention is to provide hydraulically operated clutch and anti-creep brake mechanisms for an independently operated power take-off.

Another object of this invention is to provide a hydraulically actuated independent power take-off incorporating clutching means biased towards its disengaged position and anti-creep brake means biased towards its engaged position, the hydraulic actuating means directing fluid under pressure to engage the clutch and disengage the anti-creep brake.

Another object of this invention is to provide hydraulic control means for directing fluid under pressure to fluid-actuated means and for providing sensitive control of fluid operation.

Another object of this invention is to provide hydraulic control means for actuating a hydraulically operated device including a control valve operable to direct fluid under pressure to the hydraulically operated device for actuation thereof and for relieving fluid from the hydraulically operated device in order to cease actuation thereof, which control valve incorporates relief means for diverting fluid from the device upon its attaining a pressure in excess of design pressure.

These and other objects and advantages of this invention will be apparent to one skilled in the art from the description disclosing a preferred form thereof and the accompanying drawings, in which:

FIGURE 1 is a longitudinally extending view through the clutch and anti-creep brake mechanism with portions shown in section wherein the clutch is shown in its disengaged position and the anti-creep brake is shown in its engaged position;

FIGURE 2 is a sectional view taken along the line 2—2 of FIGURE 1 and showing the gear arrangement for providing dual speed output required for modern applications and a general view of the hydraulic control valve;

FIGURE 3 is a sectional view taken on the line 3—3 of FIGURE 1 and showing details of the pumping mechanism;

FIGURE 4 is a sectional view taken along the line 4—4 of FIGURE 2 and showing the hydraulic control valve in the "on" position in which the clutch is engaged and the anti-creep brake is disengaged; and FIGURE 5 is a sectional view taken along the line 4—4 of FIGURE 2 similarly to FIGURE 4 and showing the hydraulic control valve in the "off" position in which the clutch is disengaged and the anti-creep brake is engaged.

Briefly, the invention comprises a driving member connected to a vehicle power plant. A hydraulically-actuated clutch may be actuated to selectively engage or disengage the driving member with one or more driven members, the clutch being normally spring-biased towards its disengaged position. A hydraulically-actuated anti-creep brake may be actuated to selectively engage or disengage the driven member, the brake being normally spring-biased towards its engaged position. A gear pump directs fluid under pressure to a hydraulic control valve, which valve directs fluid to the clutch and brake for engaging the clutch and disengaging the brake or, alternatively, relieves fluid from the clutch and brake for disengaging the clutch and engaging the brake. The hydraulic control valve also relieves excess pressure so as to insure smooth operation of the system.

Referring now in more detail to the drawings, there is shown a housing 10 from which extends an input or driving shaft 11, a first output or driven shaft 12 and a second output or driven shaft 13. The driving shaft 11 is journalled by a bearing 14 that is mounted in an end wall 15 of housing 10. Additionally, driving shaft 11 is journalled by a needle bearing 16 mounted interiorly of housing 10. Affixed to the inner end of driving shaft 11 is a radial flange portion 17. A clutch driving belt or cup 18 extends from radial flange portion 17 and is provided with a plurality of spaced clutch disks or plates 19.

An axial recess 20 is formed within the inner end of driving shaft 11 and receives a needle bearing 21. Positioned for rotation in the needle bearing 21 in axial recess 20 is a reduced diameter end portion 22 of the first driven or output shaft 12, the opposite end portion 23 of which is journalled in a bearing 24 mounted in an opposite end wall 25 of housing 10.

A sleeve-like collar or clutch hub member 26 is splined or otherwise suitably secured on the shaft 12 and fixedly positioned against movement relative thereto. Extending from member 26 is a radial flange portion 27 and axial extension 28. A plurality of clutch disks or plates 29 are slidably mounted on axial extension 28. It will be understood, of course, that the clutch disks 29 are alternately disposed or interleaved with respect to the clutch disks 19 so that each face of the disks in one set of disks is engaged by the face of an adjacent disk in the other set in accordance with conventional construction for a clutch of this type.

Member 26, radial flange portion 27 and axial extension 28 serve to form a chamber 30 within which an annular piston plunger 31 is slidably received. Annular sealing elements 32 and 33 are seated in grooves formed in the inner and outer surfaces of piston plunger 31, respectively, for engagement with member 26 and extension 28, respectively, so as to maintain chamber 30 in a fluid-tight condition. In a conventional manner, piston plunger 31 is engageable with the slidably mounted clutch disks 29 for effecting frictional engagement of clutch disks 29 with corresponding clutch disks 19. A spring 34 abuts piston plunger 31 and an annular plate 35 which is suitably secured to shaft 12. Spring 34 serves to bias piston plunger 31 toward a position in which clutch plates 29 are out of engagement with clutch plates 19.

A plurality of anti-creep brakes are spaced around the first output shaft 12 for cooperation with radial flange portion 27 of member 26. Housing 10 is formed with an interior chamber 36 having an axial extending chamber 37 and a further extending axial bore 38. The rod 39 is slidable within bore 38 to and from a position in which it frictionally engages radial flange portion 27 of member 26. Formed on rod 39 is the piston 40 which is slidable within chamber 37. The spring 41 engages housing 10 and piston 40 in order to bias piston 40 and rod 39 toward a position in which rod 39 frictionally engages radial flange portion 27. The annular seal 42 is seated in a groove in rod 39 and engages housing 10 so as to prevent fluid leakage through bore 38. A pair of annular seals 43 are seated in grooves within member 26 for a similar purpose.

The spur gear 44 is splined or otherwise suitably secured to shaft 12 for rotation therewith. Gear 44 engages and meshes with spur gear 45 which is suitably mounted on an idler shaft 46 in housing 10, gear 45, in turn, engages and meshes with the spur gear 47 which is splined or otherwise suitably secured to shaft 13. It is to be understood that gears 44, 45 and 47 are so designed as to provide dual speed outputs. In the preferred form of the invention, the high-speed and low-speed output shafts rotate at 1,000 r.p.m. and 540 r.p.m. respectively to provide the necessary drive for conventional implements standard to the agricultural industry. Low-speed output shaft 13 is suitably journalled in forward bearing 48 and rear bearing 49 for smooth operation. A safety cover 50 may be provided to cover the output shaft not in use for safety purposes. This cover may be secured over the shaft to housing 10 in any suitable manner.

A fluid inlet line 51 directs fluid from the main hydraulic system, not shown, to the chamber 52 formed within housing 10. Within chamber 52 is situated the gear pump 53 comprising gear 54 mounted for rotation on shaft 11 and gear 55 mounted for rotation on another shaft 56. The pressure outlet port 57 communicates the high-pressure side of pump 53 with flow passage 58 which, in turn, communicates through port 59 with flow passage 60.

As clearly shown in FIGURES 4 and 5, an important feature of this invention is the hydraulic control valve generally designated at 61 mounted for operation in a portion of housing 10. Extending through housing 10 is a stepped bore comprising an upper section 62 tapering to communicate with a first relatively small diameter portion 63 which, in turn, communicates wtih an intermediate portion 64 of slightly larger diameter than portion 63. Bore portion 64, in turn, communicates with a slightly larger, relatively large diameter lower bore portion 65. A valve seat 66 is formed at the junction of bore portions 64 and 65.

A fluid inlet port 67 communicates flow passage 60 with the intermediate bore portion 64. The fluid passage 68 serves to communicate the first bore portion 63 with a fluid delivery port 69 formed within annular member 26. Port 69 communicates with fluid chamber 30 and with fluid passage 70 and fluid chamber 37, as best seen in FIGURE 1. A pair of outlet ports 71a and 71b communicate the first bore portion 63 and lower bore portion 65 with the fluid-return line 72, by means of a conventional coupling (not shown), leading to the reservoir. The lower end of lower bore portion 65 is sealed by means of a cap 73 threaded or otherwise secured to housing 10; and an annular seal 74 is provided to prevent fluid leakage.

An annular guide block 75 is threaded into upper bore section 62 and is provided with an inturned extension forming a chamber 76 in which is seated a garter spring 77.

A cap member 78 is threaded or otherwise suitably secured to the housing 10 above annular guide block 75 and, in turn, provides a seat for valve stem guide 79 threaded thereto. A valve stem 80 is slidably received in guide 79, valve stem 80 being secured to a plunger 81 having a reduced abutment portion 82 extending from the lower end thereof. A valve rod 83 is secured to portion 82 of plunger 81 and extends downwardly therefrom into lower bore portion 65. To the extreme lower end of rod 83 is affixed a flange or abutment member 84. Plunger 81 is provided with an annular groove 85 having a diameter equal to the diameter of lower extending portion 82. It will be noted that plunger 81 is slidably received for movement within annular guide block 75.

A valve spool 86 is mounted in sliding relationship on rod 83. Valve spool 86 includes a piston valve portion 87 cooperable with the first bore portion 63 and a conical or poppet valve portion 88 cooperable with valve seat 66. A spring 89 serves to bias valve spool 86 relative to rod 83 in a direction tending to seat valve 88 on valve seat 66.

When the independent power take-off is disengaged, spring 34 serves to bias piston plunger 31 to the left as shown in FIGURE 1 toward a position in which clutch disks 19 and 29 are disengaged. At the same time spring 41 serves to bias rod 39 to the right as shown in FIGURE 1 toward a position in which the end thereof frictionally engages radial flange portion 27 of member 26. In this position shaft 11, being connected to the power plant, rotates freely while shafts 12 and 13 are held in a stationary position not subject to free-wheeling such as might otherwise result from fluid currents within the system, for example.

To engage the independent power take-off, valve stem 80 is moved in an upward direction to place valve 61 in the position shown in FIGURE 4. In this position spring 77 contracts about the reduced diameter portion 82 of plunger 81 to serve, in effect, as a latching mechanism. Rod 83 is carried upwardly and compresses biasing spring 89 which, in turn, moves valve spool 86 upwardly until valve 88 is seated against valve seat 66 under the influence of a spring force of predetermined magnitude. In this position of valve 88 piston valve 87 clears pressure port 68. It should be understood that spring 77 may be made to contract about the reduced diameter portion 82 of plunger 81 at positions other than that shown in FIGURE 4, whereby the compression of biasing spring 89 could be varied.

Rotation of gears 54 and 55 pumps fluid through bore 57, passage 58, port 59 and passage 60 to valve inlet port 67 from whence it flows through the intermediate bore portion 64 and the first bore portion 63 around valve spool 86 and then through pressure passage 68 to passages 69 and 70 and finally into chambers 30 and 37. Pressure moves piston plunger 31 to the right and piston 40 to the left, respectively, as shown in FIGURE 1. Under the influence of this pressure each of the anti-creep brakes is disengaged from frictional contact with radial flange portions 27 of member 26 and piston plunger 31 forces clutch disks 19 and 29 into engagement. Power is transmitted from shaft 11 to shaft 12 and through gears 44, 45 and 47 to shaft 13. Thus an associated implement may be driven at high or low speed as desired.

A surge or other undesirable build-up of fluid pressure beyond the predetermined design value is directed to the intermediate bore portion 64 and first bore portion 63 below piston valve 87 of valve spool 86. Since bore portion 64 is of larger diameter than bore portion 63, the area of valve 88 subjected to this pressure is larger than that of valve 87. Fluid pressure acts against valve 88 with a greater force than against valve 87. When the resultant or differential force exceeds the predetermined force designed into spring 89, valve spool 86 is moved downwardly relative to rod 83 to a position in which valve 88 is unseated from valve seat 66. Fluid then flows from intermediate bore portion 64 into lower bore portion 65 and then through outlet port 71b and return passage 72 where gear 47 acts as a slinger pump directing oil to the reservoir. Thus in addition to controlling operation of the clutch and anti-creep brake, valve spool 86 also serves to relieve excess pressures in the system. It should be noted, however, that when valve spool 86 is moved downwardly under the influence of excessive pressures it carries with it piston valve portion 87 to a position in which flow through pressure passage 68 is only partially blocked, whereby flow to chambers 30 and 37 is maintained constantly. Erratic, jerky operation of the clutch and anti-creep brake is avoided.

The operator may disengage the independent power take-off by moving valve stem 80 to the position shown in FIGURE 5. In this position plunger 81 is oriented so that groove 85 is in alignment with spring 77 and the co-action of these two elements serves to latch the valve 61 as shown. Spring 89 exerts a predetermined force on valve spool 86 and so positions it that piston valve 87 co-acts with the first bore portion 63 to block flow from inlet port 67 through the intermediate bore portion 64 to first bore portion 63. At this time piston valve 87 allows flow from pressure port 68 through the first bore portion 63 to outlet port 71a. Accordingly, flow from pump 53 enters through inlet port 67, passes through the intermediate bore portion 64 and past valve 88, which has been moved away from valve seat 66, and through lower bore portion 65 and its associated outlet port 71b to return passage 72 and thence to the main hydraulic reservoir. Biasing springs 34 and 41 exert forces upon piston plunger 31 and pistons 40, respectively, which, in turn, force fluid from chambers 30 and 37 through passages 69 and 70 and then through passage 68, the first bore portion 63 and its associated outlet port 71a to return passage 72. Under this influence clutch disks 19 and 29 are disengaged and rods 39 are moved into frictional engagement with radial flange portion 27 of member 26.

The anti-creep brakes need not be of large magnitude in order to prevent freewheeling rotation of the output shafts 12 and 13.

It is to be understood that the foregoing descriptions and the accompanying drawings have been given only by way of illustration and example. Changes of the elements, re-arrangement of parts, and substitution of equivalent members, all of which will be obvious to those skilled in the art, are considered to be within the scope of the present invention which is limited only by the claims following.

We claim:

1. In an independent power take-off, the combination comprising: a housing; a driving shaft journaled in said housing; a driven shaft journaled in said housing; hydraulically actuated clutch means between said shafts and engageable for drivingly connecting said driving shaft with said driven shaft; hydraulically actuated anti-creep brake means separate from said clutch means and engageable for restricting rotation of said driven shaft when said clutch means is disengaged; first resilient means in engaging relationship with said clutch means for biasing said clutch means toward its disengaging position; second resilient means in engaging relationship with said anti-creep brake means for biasing said anti-creep brake means toward its engaging position; and hydraulic flow control means communicating with said clutch means and said anti-creep brake means for selectively directing hydraulic fluid to and from said clutch means and said anti-creep brake means for respectively engaging said clutch means and disengaging said anti-creep brake means and for allowing disengaging of said clutch means and engaging of said anti-creep brake means under the influence of said first and second resilient means; said hydraulic flow control means including valve means having a housing defining a stepped valve bore with relatively large and small port portions, an inlet communicating a source of fluid under pressure with said relatively large bore portion, passage means communicating said relatively small bore portion with said clutch means and said anti-creep brake means, an outlet communicating with said valve bore, a valve spool slidable in said valve bore and having a piston valve portion cooperable with said relatively small bore portion and another valve portion cooperable with said relatively large bore portion, means biasing said valve spool toward a first position in which said piston valve portion communicates said inlet with said passage means, said valve spool being responsive to differential force in said bore portions for movement against the force of said biasing means toward a second position in which said other valve portion communicates said inlet with said outlet, and means operatively associated with said valve means for moving said valve spool toward a third position in which said inlet and said passage means communicate with said outlet.

2. The invention according to claim 1; further comprising means operatively associated with said valve means for varying the force of said valve spool biasing means.

3. The invention according to claim 2; said biasing means including a spring interposed between said valve spool and an abutment member; said varying means including means for changing the position of said abutment member so as to correspondingly change the force exerted by said spring on said valve spool.

4. A fluid flow control valve comprising: a housing defining an inlet adapted to communicate with a source of fluid under pressure, passage means adapted to communicate with a fluid actuated device, and an outlet adapted to communicate with a fluid return; valve means in said housing selectively movable between a first position communicating said inlet with said passage means and a second position communicating said passage means with said outlet; means associated with said valve means for effecting said selective movement; said valve means being responsive to fluid pressure in said inlet above a predetermined pressure for movement between said first position and a third position communicating said inlet with said passage means and outlet; and means associated with said valve means for predetermining said pressure, said housing defining a bore; said inlet, outlet, and passage means communicating with said bore; and said valve means comprising a valve spool having first and second valve portions slidable in said bore, said first valve portion communicating said inlet with said passage means when said valve means is in said first position, said first and second valve portions respectively communicating said passage means with said outlet when said valve means is in said second position, said first and second valve portions respectively communicating said inlet with said passage means and outlet when said valve means is in said third position.

5. The invention according to claim 4; said bore defined by said housing having relatively small and large bore portions; said first and second valve portions being cooperable respectively with said relatively small and large bore portions whereby fluid pressure in said inlet passage causes forces of different magnitudes acting upon said valve portions; said predetermining means including a spring acting upon said valve spool in opposition to the resultant of said forces.

6. In combination: a housing defining a bore having first, second, and third bore portions respectively of small, intermediate and large diameters; a valve seat formed at the juncture of said second and third bore portions; an inlet communicating with said second bore portion; first and second outlets communicating respectively with said first and third bore portions; a motor passage communicating with said first bore portion between said first outlet and said second bore portion; a valve stem movable in said bore and carrying a flange; a valve spool slidable on said valve stem and having a piston valve portion slidable in said first bore portion and a poppet valve portion engageable with said valve seat; a spring mounted on said valve stem and engaging said flange and said valve spool to bias said valve spool toward a first position in which said piston valve portion is between said motor passage and said first outlet while said poppet valve portion is seated on said valve seat; said valve stem having an abutment portion engageable with said valve spool for moving said valve spool toward a second position in which said piston valve portion is between said motor passage and said second bore portion while said poppet valve portion is unseated from said valve seat; said valve spool being movable from said first position under the influence of fluid pressure in said inlet toward a third position in which said piston valve portion is between said motor passage and said first outlet while said poppet valve portion is unseated from said valve seat; and means cooperating with said valve stem for selectively determining the distance between said flange and said valve spool whereby to selectively determine the biasing force of said spring acting upon said valve spool.

References Cited by the Examiner
UNITED STATES PATENTS

| | | |
|---|---|---|
| 2,506,842 | 5/50 | Rockwell. |
| 2,725,890 | 12/55 | Kanuch. |
| 2,737,834 | 3/56 | Coughlin et al. |
| 2,905,290 | 9/59 | Munschauer. |
| 2,950,734 | 8/60 | Hasbany _____ 192—13 X |
| 3,111,134 | 11/63 | Musser _____ 137—102 |

DAVID J. WILLIAMOWSKY, *Primary Examiner.*

THOMAS J. HICKEY, *Examiner.*